US006966352B2

(12) United States Patent
Storck et al.

(10) Patent No.: US 6,966,352 B2
(45) Date of Patent: Nov. 22, 2005

(54) DEVICE FOR HANDLING PACKAGING MATERIAL

(75) Inventors: Dominique Storck, Wilwisheim (FR); Jens Kallfass, Nüertingen (DE)

(73) Assignee: Kallfass Verpackungsmaschinen GmbH Co., Nurtingen-Zizishausen (DE)

( * ) Notice: Subject to any disclaimer, the term of this patent is extended or adjusted under 35 U.S.C. 154(b) by 98 days.

(21) Appl. No.: 10/430,323

(22) Filed: May 7, 2003

(65) Prior Publication Data

US 2003/0218049 A1 Nov. 27, 2003

(30) Foreign Application Priority Data

May 24, 2002 (DE) ................................ 102 24 360

(51) Int. Cl.[7] ................................................ B65B 9/00

(52) U.S. Cl. ..................... 156/516; 156/73.5; 156/271; 156/259; 156/308.4; 156/530; 156/555; 493/194; 493/203; 493/208

(58) Field of Search .......................... 53/455, 459, 478, 53/479, 562, 567, 568, 570; 493/194, 203, 493/208, 346, 381; 156/73.5, 259, 270, 271, 156/516, 530, 555, 308.4

(56) References Cited

U.S. PATENT DOCUMENTS

| | | | | |
|---|---|---|---|---|
| 3,269,278 | A | 8/1966 | Olstad | |
| 4,070,222 | A | 1/1978 | Olson | |
| 4,211,599 | A | 7/1980 | Bolter et al. | |
| 4,259,134 | A | 3/1981 | Joice et al. | |
| 4,308,087 | A | 12/1981 | Johnson | |
| 4,547,772 | A | 10/1985 | Ernst | |
| 4,687,532 | A | 8/1987 | Johnson | |
| 5,155,979 | A | 10/1992 | McDonald | |
| 2003/0046905 | A1 * | 3/2003 | Kaechele et al. | 53/459 |

FOREIGN PATENT DOCUMENTS

| | | |
|---|---|---|
| DE | 1 121 918 | 9/1957 |
| DE | 2 239 428 | 8/1973 |
| FR | 1 039 842 | 10/1953 |

* cited by examiner

*Primary Examiner*—Linda Gray
(74) *Attorney, Agent, or Firm*—Nath & Associates PLLC; Gregory B. Kang; Derek Richmond

(57) ABSTRACT

A welding device has two mutually engaging welding wheels, together with a separating device having a blade with a cutting edge. Two film webs can be welded together in conventional manner using the welding device. The blade is able to separate a projecting length from the welded film, the blade being heated. Heating takes place by a heat bridge, which connects the blade to a heater of the welding device. This economizes a separate heater for the blade.

9 Claims, 1 Drawing Sheet

DEVICE FOR HANDLING PACKAGING MATERIAL

FIELD OF APPLICATION AND PRIOR ART

The invention relates to a device provided with a welding device and a separating device for handling packaging material, especially film webs. In particular, the packaging material is in the form of film webs, which are interconnected to form a double-layer composite and are subsequently separated with a specific, lateral width.

Such devices are used in order to envelop articles, like cartons or goods in general terms, in film tubes, which are formed from two film webs or semicircular films, whose edges are welded together. One such device is described in U.S. Pat. No. 4,211,599. Since generally film webs of the same width are used for this purpose, but the articles to be enveloped therein have different and in particular smaller widths, apart from the joint weld, the film webs have a projecting length. The latter has to be cut off. Account must be taken of many different circumstances in order that separation can be performed reliably and with limited effort and expenditure.

PROBLEM AND SOLUTION

The problem of the invention is to provide a device of the aforementioned type with which the cutting or separating of packaging material or film webs is possible in an easy manner and with a satisfactory result, whilst keeping costs within reasonable limits.

This problem is solved by a device having the features of claim 1. Advantageous and preferred developments of the invention form the subject matter of the further claims and are described in greater detail hereinafter. By express reference the wording of the claims is made into part of the content of the present description.

According to the invention the welding device has a heater, in order by heat action to join together or weld the sheets of packaging material or the film webs in known manner. As a result the film webs can be interconnected in an elongated area, particularly in a continuous manner. The separating device has a blade means, which is fixed or is positioned in a stationary and immovable manner. This blade means in turn has a blade with a cutting edge. The cutting edge cuts through the film webs, for example cutting off a projecting length or a joint weld. In addition, the blade means or blade is heated. This improves cutting through the film webs and gives an improved cut result. The blade means and the entire device are advantageously constructed solely for cutting through and not for further functions, like welding.

The blade means is advantageously made from metal. Preferably use is made of copper, particularly due to its heat conducting properties. The blade can also be made from steel or tool steel.

It is particularly advantageous for the blade means to be permanently heated. It is advantageously kept at a constant temperature, so that the cutting result is maintained constant.

To limit expenditure for the device, the blade means can be connected in heat conducting manner with the heater of the welding device. Thus, with a single heater it is possible to heat both the welding device and the blade means. There is consequently no need for additional or separate heaters for the blade means. One possibility for a heat conducting connection is a continuous heat bridge between the heater of the welding device and the blade means. The heat bridge advantageously extends into the vicinity of the blade on the blade means. One possibility for constructing a heat bridge involves the use of metal, particularly a very good heat conducting metal. The heat bridge can fulfil further functions, as it can be part of a holder or fastener for the blade means. The heat bridge can be part of the separating device or the blade means. It can be in one piece and in particular integral with the blade means.

The blade means with the cutting edge advantageously extends through the film web. With particular advantage it extends a reasonable distance therethrough, for example up to a centimetre. This ensures that the film web does not always engage precisely at one point on the blade and is still cut if there is a slight displacement.

The cutting edge can at least partly be inclined to the film web plane. The angle can be between 10° and 50° and advantageously between 15° and 35°. The inclination of the cutting edge relative to the film webs can be such that the cutting edge is inclined in the film web passage direction and towards the film webs. This can give an advantageous cutting result.

In a further development of the blade means or blade the cutting edge can have an angular notch shape. The angle or apex is roughly located in the plane of the film webs. This ensures that when the blade means or cutting edge enters the film web orients itself or centres itself. Advantageously both angle sides have a similar or identical inclination to the film web plane.

In a further development of the blade means it or the cutting edge can be provided with an antistick or sliding coating. This improves the cutting action and a sticking of the films is prevented on heating the blade means. When coating the cutting edge it is advantageous to coat the entire area of the blade means in the vicinity of the cutting edge.

The welding device can have circumferential welding means or two rotating welding means. One of the welding means can pass over and another under the plane of the film webs. Said two welding means press the film webs between them in the manner of engaging wheels. Through the welding device heater used for heating at least one of the welding means or wheels, the films are heated and welded together.

Advantageously the separating device is positioned a short distance behind the welding means and such a short distance is advantageously a few centimetres. This offers the advantage that the aforementioned heat conducting connection need not be as long and any residual heat of the film can be utilized with a similar effect to the heating of the blade means.

These and further features can be gathered from the claims, description and drawings and the individual features, both singly or in the form of subcombinations, can be implemented in an embodiment of the invention and in other fields and can represent advantageous, independently protectable constructions for which protection is claimed here.

BRIEF DESCRIPTION OF THE DRAWING

An embodiment of the invention is shown in the drawing and will be explained in greater detail hereinafter.

DETAILED DESCRIPTION OF THE EMBODIMENT

Figure 1:
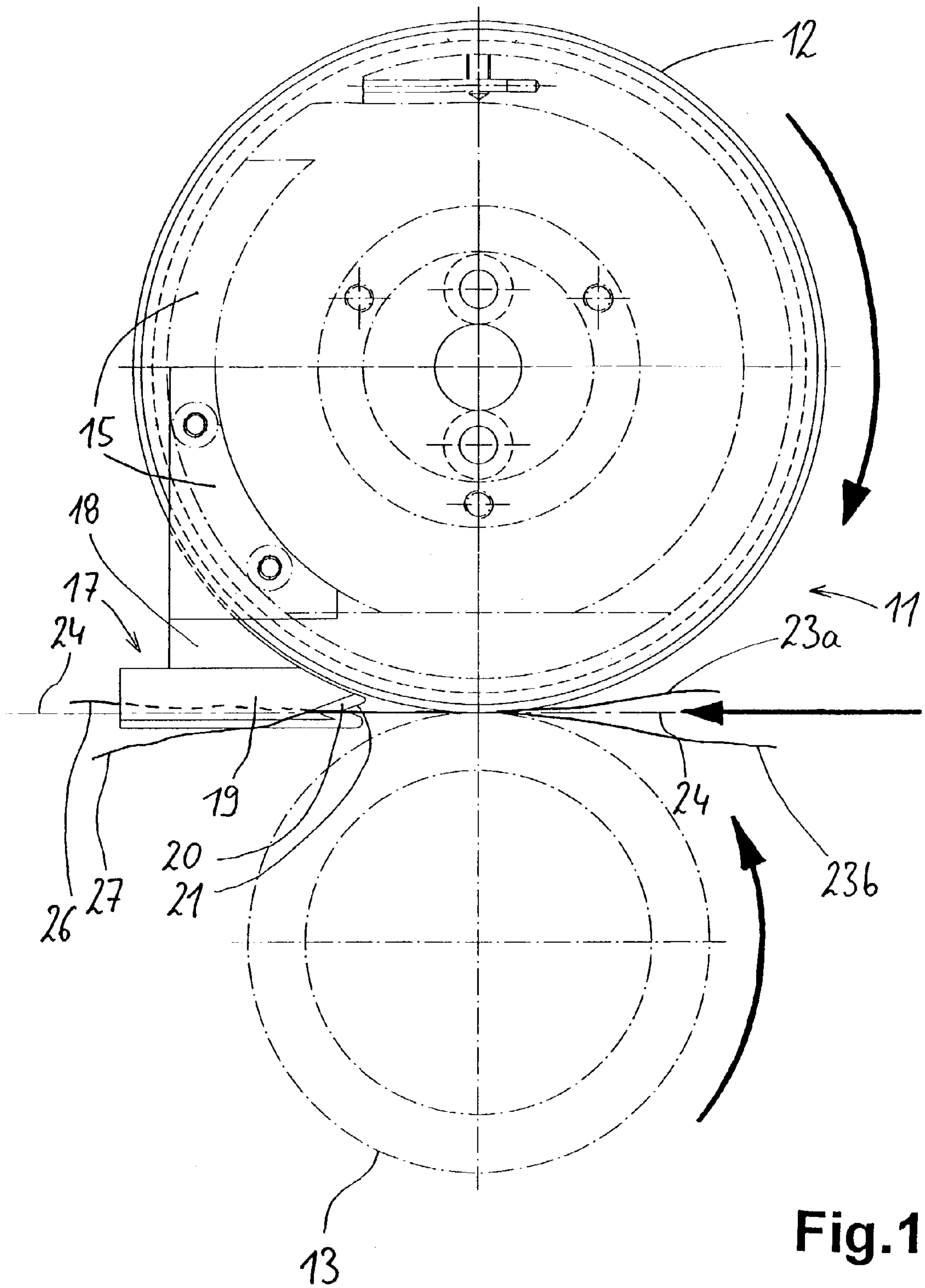
FIG. 1 shows a welding device with a heater and a separating device connected thereto in the form of a blade means for welding film webs and for separating a projecting length.

FIG. 1 shows a welding device 11 for films, as can be taken from U.S. Pat. No. 4,211,599. It has an upper welding wheel 12 and a lower welding wheel 13, which serves as a counterwheel. The welding wheels 12 and 13 rotate in opposite directions, as indicated by the thick arrows.

The upper welding wheel 12 is provided with a heater 15. The heater 15 is circular segmental and extends over a certain radial area. In a lower region it is provided with an angular widening which extends up to the heat bridge 18. The function of said heater and possible embodiments thereof can be gathered from U.S. Pat. No. 4,211,599, to which express reference is made for this purpose.

To the left alongside the welding device 11 and therefore in the film passage direction, indicated by the thick, straight arrow to the right of the drawing, the separating device 17 is located behind the welding device. The separating device is connected by means of the symbolically represented heat bridge 18 to the heater 15. The separating device 17 has a blade means 19, which is connected in heat conducting manner to the heat bridge 18. The drawing shows that the blade means 19 is held on or carried by the heat bridge 18.

The blade means 19 has a blade 20 with a cutting edge 21. As can be seen in the drawing, the blade 20 with the cutting edge 21 has an angular construction in such a way that the film enters precisely in the angle.

Film webs 23, namely an upper film web 23*a* and a lower film web 23*b* are also shown. They are spaced from one another to the right and therefore upstream of the welding device 11. In the manner shown, one or both film webs 23 can diverge from the film web plane 24, as is shown in interrupted manner.

Behind the welding device 11 the film webs 23 are interconnected and run in the film web plane 24. They run against the cutting edge 21 of blade means 19 and are separated. Separation takes place in an area of the connected film 26 and projecting length 27. The projecting length 27 essentially comprises an area projecting over the joint weld. It must be borne in mind that the joining of the film webs 23 takes place in the horizontal plane 24. Separation of the film webs takes place in a plane perpendicular thereto in lateral, juxtaposed areas. Following separation, the projecting length 27 can either drop laterally alongside the device or can be wound up or sucked in.

The blade 20 with the cutting edge 21 can, as indicated hereinbefore, have a coating. Such a coating can be used for reducing sliding friction on the blade. It is also advantageous to provide an adhesion-reducing or adhesion-preventing coating. This reduces or avoids the sticking of heated film areas to the blade means.

As can also be gathered from the drawing, various possibilities exist for the inventive joining of the blade means 19 to the heater 15 through the heat bridge 18. If the heater for one or both welding wheels is further removed from the separating device 17, e.g. in the area of the drawing in of the film webs 23, the heat bridge 18 must overcome a larger distance. However, this does not alter the implementation of the inventive concept.

It is also possible to provide with a thermal insulation to the outside at least the heat bridge 18 and also parts of the blade means 19 in such a way that heat losses by heat radiation or cooling can be reduced.

In place of a welding device 11 with wheels, it would also be possible to use a welding device with circulating and partly heated belts. It is here again obvious to the expert that a separating device according to the invention with a heat bridge between the blade means and the heater can be provided for the welding device.

The distance between the contact area of the welding wheels, where welding of the film takes place, and the cutting edge is on the one hand determined by geometrical circumstances. On the other hand in the case of certain desired temperatures of the film, on engaging the cutting edge in conjunction with the cutting edge temperature, the temperature can be varied over said distance. Finally, the film cools relatively rapidly again after welding due to its surface area.

What is claimed is:

1. Device for handling sheets of packaging material, with:

a welding device for joining two layers of packaging material, said welding device having a heater for joining said two layers of packaging material, wherein said welding device has two rotating welding means, one said welding means being located above and said other welding means being located below said plane of said two layers of packaging material, wherein said two welding means compress said two layers of packaging material between them, and a separating device for separating said two layers of packaging material joined by said welding device, said separating device having a fixed, immovable blade means with a cutting edge, wherein:

said blade means are heated, said blade means is connected in heat conducting manner to said heater of said welding device, said blade means is connected to said heater of said welding device by a continuous heat bridge, said heat bridge extends up to said blade means, wherein said separating device is positioned shortly behind said welding means in a direction of transport of said two layers of packaging material and said blade means are constructed solely for cutting through the packaging material instead of a welding function.

2. Device according to claim 1, wherein said two layers of packaging material are joined in an elongated area.

3. Device according to claim 1, wherein said blade means is permanently heated.

4. Device according to claim 1, wherein said heat bridge is part of said separating device or said blade means.

5. Device according to claim 1, wherein there is provided a holder for said blade means and said heat bridge is part of said holder.

6. Device according to claim 1, wherein said blade means is made from metal.

7. Device according to claim 1, wherein said two layers of packaging material form a plane and said cutting edge is at least partly inclined to said plane, wherein said inclination angle is between 10° and 50°.

8. Device according to claim 4, wherein said cutting edge has an angular notch shape with an angle roughly being located in said plane of said two layers of packaging material.

9. Device according to claim 1, wherein said blade means is provided with a antistick coating.

* * * * *